United States Patent [19]

Simmons et al.

[11] Patent Number: 4,525,831
[45] Date of Patent: Jun. 25, 1985

[54] INTERFACE ARRANGEMENT FOR BUFFERING COMMUNICATION INFORMATION BETWEEN A TRANSMITTING AND RECEIVING STAGE OF A TIME-SPACE-TIME DIGITAL SWITCHING SYSTEM

[75] Inventors: Nathaniel Simmons, Downers Grove, Ill.; Kamal I. Parikh, Phoenix, Ariz.

[73] Assignee: GTE Automatic Electric Inc., Northlake, Ill.

[21] Appl. No.: 506,564

[22] Filed: Jun. 22, 1983

[51] Int. Cl.³ ............................................. H04Q 11/04
[52] U.S. Cl. ..................................................... 370/63
[58] Field of Search ........................ 370/63, 64, 58, 68

[56] References Cited

U.S. PATENT DOCUMENTS

| | | | |
|---|---|---|---|
| 3,700,819 | 10/1972 | Marcus | 370/68 |
| 4,081,610 | 3/1978 | Valastro et al. | 370/63 |
| 4,206,322 | 6/1980 | Lurtz | 370/63 |
| 4,320,501 | 3/1982 | Le Dieu et al. | 370/68 |
| 4,392,224 | 7/1983 | Mori et al. | 370/68 |

Primary Examiner—Douglas W. Olms
Attorney, Agent, or Firm—Anthony Miologos; Peter Xiarhos

[57] ABSTRACT

An interface arrangement is shown compensating for timing delays during transmission of communication information between a transmitting and receiving stage of a T-S-T digital switching system. The arrangement includes a buffer at the receiving stage having first and second storage files. During a first time slot communication information is written in the first file using control signals transmitted along with the communication information while simultaneously the second file is read using a local control signal. In the subsequent time slot the second file is written to and the first file is read, providing a one time slot slip between the transmitting and receiving stages.

12 Claims, 4 Drawing Figures

INTERFACE ARRANGEMENT FOR BUFFERING COMMUNICATION INFORMATION BETWEEN A TRANSMITTING AND RECEIVING STAGE OF A TIME-SPACE-TIME DIGITAL SWITCHING SYSTEM

BACKGROUND OF THE INVENTION

This invention relates in general to a time-space-time (T-S-T) telecommunications switching systems and in particular to an interface arrangement compensating for a system clock skew and a cable delay during transmission of communication information between a transmitting and receiving stage of a T-S-T digital switching system.

Time-space-time (T-S-T) switching systems are a configuration of digital switching elements providing both time and space translation between channels of time division multiplexed (TDM) telecommunications transmission lines. The T-S-T network of a switching system interconnects digital TDM communication lines with TDM communication involving the sharing of a single transmission paths, individually, in time, to provide multiple channels in a single transmission medium. The construction of such a T-S-T network comprises the connection of a spacial stage between the two time stages.

These networks normally operate at very high transmission rates. For example, in a T-S-T network where a single path through the network is divided into 386 channels or time slots the transmission of all 386 channels can occur in 125 microseconds. Therefore, each time slot has a duration of 324 nanoseconds.

Since the transmission from one stage to another requires timing synchronization, any delays introduced between the transmitting and receiving stages will affect the synchronization and therefore cause loss of channels.

The timing delays may be caused by timing skew between identical signals in different stages. Long cables used between stages can also introduce propagation delays. For example, a 100 ft. cable can introduce 178 nanoseconds of delay between a transmitting and receiving stage.

Therefore, the interface of the present invention compensates for timing delays between a transmitting and receiving stage of a T-S-T digital switching system.

SUMMARY OF THE INVENTION

The interface arrangement of the present invention buffers communication information (PCM samples) between a transmitting stage and a receiving stage of a time-space-time digital switching network. The digital switching network also includes a network clock until transmitting a master-clock signal defining at least a first and a second time slot. Communication information is transmitted from the transmitting stage to the receiving stage during each time slot.

The interface arrangement comprises storage means connected to the transmitting stage with the storage means including first and second addressable storage files. A first control signal generating means associated with the transmitting stage is arranged to receive the master-clock signal. The first control signal generating means develops and transmits to the storage means during the first time slot a first set of control signals for addressing and writing the communication information into the first storage file. The first control signal generating means also develops and transmits a second set of control signals during the second time slot for addressing and writing the communication information available during the second time slot into the second storage file.

A second control signal generating means associated with the receiving stage also receives the master-clock signal. The second control signal addressing means develops and transmits to the storage means during the first time slot a first set of control signals for addressing and reading the communication information from the second storage file. During the second time slot, the second control signal generating means develops a second set of control signals for addressing and reading communication information from the first storage file. During the first time slot the storage means is operated to write communication information in the first storage file and simultaneously to read communication information from the second storage file. Conversely, during the second time slot the storage means is operated to write communication information in the second storage file and simultaneously to read communication information from the first storage file.

DESCRIPTION OF THE PREFERRED EMBODIMENT

Figure 1:
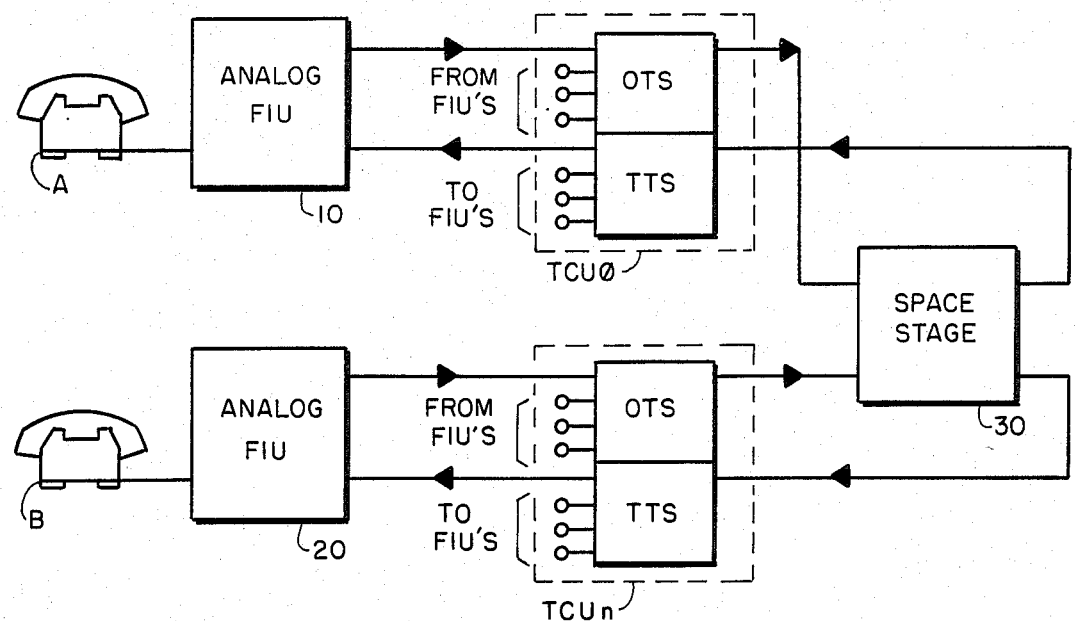
FIG. 1 is a block diagram depicting the network structure of a time-space-time digital switching system.

FIG. 1, is a block diagram showing the single rail structure of a time-space-time network of a digital switching system for switching a local telephone call. Telephone subscriber A is connected to analog facility interface (FIU) 10. The analog FIU has a PCM voice connection to time and control unit (TCU) 0. A digital switching network may contain n number of TCUs. Each TCU has two time stages associated with it, an originating time stage (OTS) and a terminating time stage (TTS).

Each time stage (OTS or TTS) of each TCU may be connected to up to four FIUs. The number of TCUs is modularly expandable and may grow to fit the needs of the switching system.

Next, the connection is made from the OTS of the particular TCU, in this example TCU 0 to the space stage (SS) 30 and the terminating time stage of TCU n. The telephone subscriber B is then connected through analog FIU 20 to the TTS of TCU n.

A voice transmission link is next established from subscriber B to subscriber A. This communication link is established via analog FIU 20, through the OTS of TCU n, through space switch 30, to the TTS of TCU 0 and finally through analog FIU 10 to subscriber A. At this time, a two-way talking path has been established between subscriber A and subscriber B.

Figure 2:
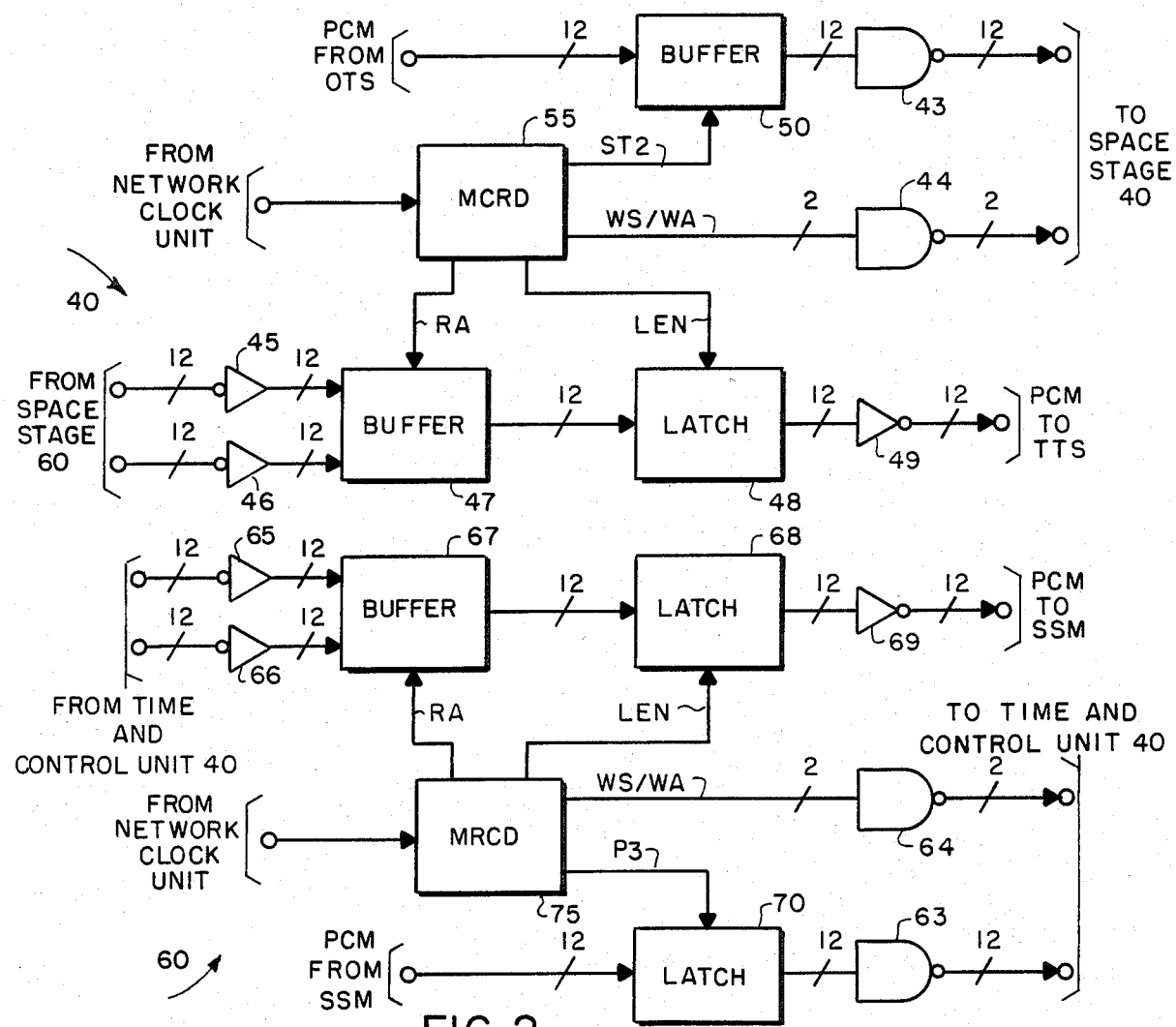
FIG. 2 is a block diagram representing two identical interfaces of the present invention as found in the time stage and the space stage.

Turning now to FIG. 2, a block diagram of the arrangement of the present invention is illustrated. The arrangement comprises two identical interfaces, the first interface 40 is located in the time and control unit and the second interface 60 in the SS. PCM voice samples from the originating time stage (OTS) are written in buffer 50 and transmitted via a slow DC link to the SS buffer 67 of interface 60 via driver 43 and line receiver 65.

It should be noted that twelve bits are used to represent the PCM sample, seven bits represent the amplitude of the voice signal, one bit represents the sign of the voice signal and three bits of supervisory signals and one parity bit.

A write address (WA) and a write strobe (WS) control signals are generated by a master-clock receiver distributor (MCRD) 55 and transmitted along with the PCM voice sample via a fast DC link to the SS buffer 67 of interface 60, via line driver 44 and line receiver 66. The write address and write strobe control signals address and write respectively the sample into buffer 67.

At the appropriate time, normally one time slot later, the PCM voice sample is read out of buffer 67 using a read address (RA) control signal which is generated in the space stage MCRD 75. It should be noted that both MCRDs 55 and 75 receive a masterclock signal from a network clock unit and generate the system timing for each interface. The PCM voice sample read out of buffer 67 is captured by output latch 68 using a latch enable signal (LEN). At this time, the PCM voice sample is transmitted to the space stage matrix (SSM) via output buffer 69.

PCM voice samples from the space stage matrix are transmitted to the terminal time stage (TTS) of a TCU in much the same manner as described above. Latch 70 via control signal P3 generated by the MCRD 75 captures the voice sample output from the space stage matrix (SSM). The voice sample is transmitted to buffer 47 of the TCU interface 40 via a slow DC link, line driver 63 and line receiver 45. Control signals WS and WA generated by the space stage MCRD 75 are transmitted via a fast DC link through line driver 64 and line receiver 46. The voice sample written into TCU interface 40 buffer 47 is read out of the buffer at appropriate time using control signal RA generated by the TCU MCRD 55. The sample read out of buffer 47 is captured by latch 48 using a latch enable signal LEN. At this time, the sample is output to the terminal time stage TTS of the TCU via output buffer 49.

Figure 3:
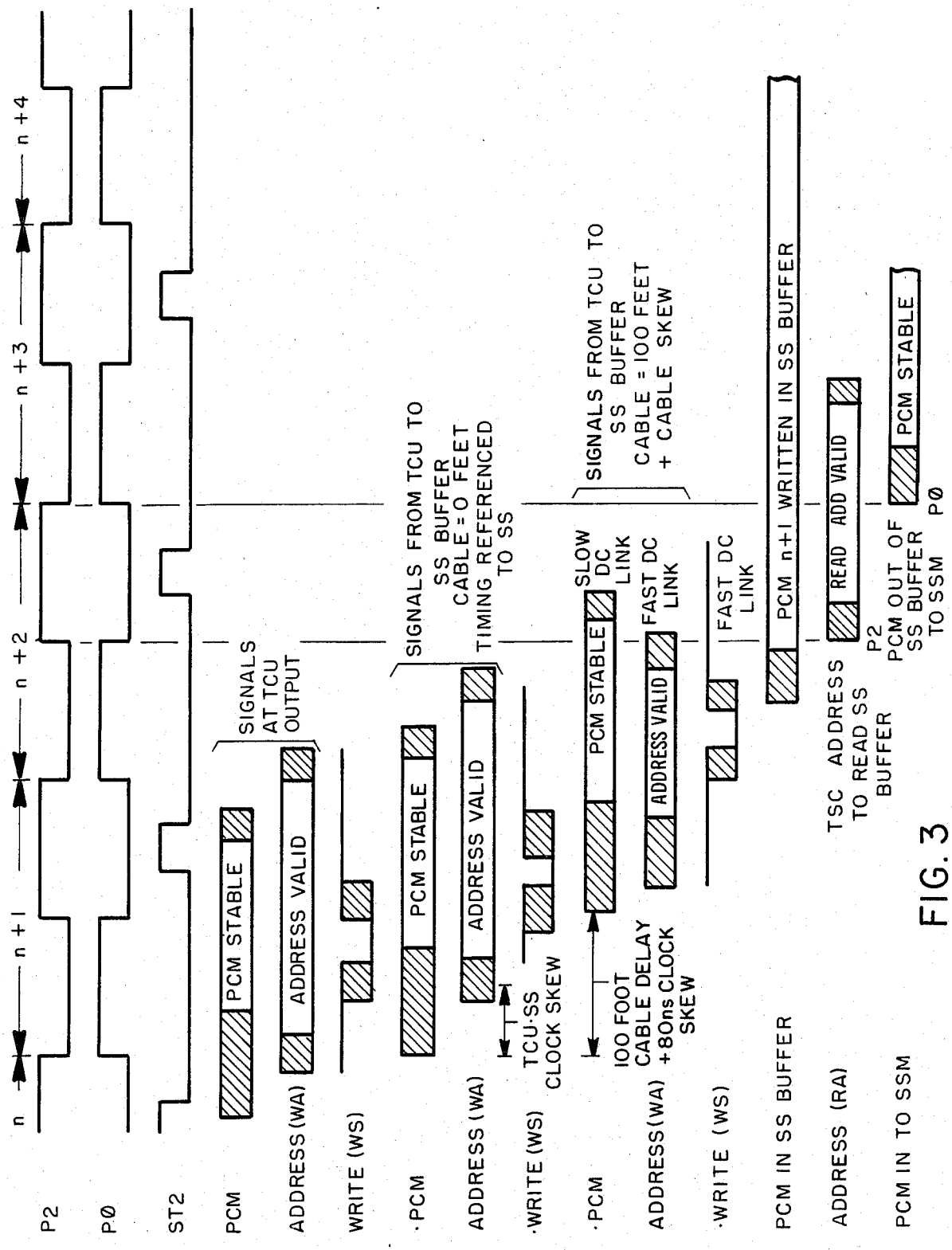
FIG. 3 is a timing diagram showing the PCM write-/read operation for the interface of the present invention located in the time stage.

With reference to FIG. 3, a timing diagram showing the PCM write/read operation for the TCU to SS PCM interface is illustrated. It should be noted that the following explanation is for the transmission of voice samples from the TCU to the SS with the transmission of PCM samples from the SS to the TCU being substantially the same with minor exception.

PCM voice samples are transmitted from the time and control unit to the SS during every time slot (n, n+1, etc.). Each time slot in the network represents an information channel with the network having the capacity to handle 386 channels during a 125 microsecond period. Therefore, each time slot has a channel time of 324 nanoseconds (125 ms÷386). Each time slot interval is divided into two equal 162 nanosecond halves referred to as phase 0 (P0) and phase 2 (P2). The interface of the present invention uses the P0 signal as a time slot reference. All timing signals are derived by a master-clock receiver distributor (MCRD) terminating a master timing signal of 12.352 MHz from a network clock unit.

The MCRD generates a four phase clock including P0 and P2 and also P1 and P3 which are complementary to each other and occur 81 nanoseconds after P0 and P2 respectively. The MCRD also generates a strobe 2 (ST2) signal and a time slot counter signal.

The time slot counter, located within the MCRD, is a 9-bit counter which generates a binary count from 0 to 385 resets to 0 and recycles. As explained in FIG. 1, MCRD 55 in the TCU as well as MCRD 75 in the SS are identical.

With renewed reference to FIG. 2 as well as FIG. 3, PCM samples are read out of the TCU OTS and latched in output buffer 50 on the rising edge of ST2 during every time slot. The PCM sample read out of the OTS during time slot n is present at the TCU drivers 43 at the beginning of time slot n+1. The write address signal (WA) is derived from the least significant bit of the time slot counter and the write strobe is generated by the combination of P1 and P0 signals. As can be seen in FIG. 3, the signals at line drivers 43 and 44 correspond to the signals at the output of the TCU and are present for a substantial portion of time slot n+1.

It can well be appreciated by those skilled in the art that a certain amount of timing skew is normally present between identical signals in different modules, i.e. time and control unit and the space stage. This clock skew has a worst case inter-module difference of approximately 80 nanoseconds. Further, the use of cables between the TCU and the space stage will cause a cable delay that delays the arrival of the PCM sample and control signals at the space stage buffer 67. For a 100 ft. cable (worst case condition) the delay time is defined as 178 nanoseconds. Therefore, a total delay of 258 nanoseconds (178+80) may be assumed between the sending of the sample from the TCU to the time it is written in buffer 67. Since each time slot is 324 nanoseconds in duration a fixed slippage of one time slot is introduced by the buffers to compensate for the skew.

Therefore, in a worst case condition, the PCM voice sample read out of the OTS of the TCU during time slot n is written into buffer 67 during the second half of time slot n+2. As can be seen in FIG. 3, if only the clock skew and no cabling delay is present the PCM voice sample, address and write strobe signals arrive and are written in buffer 67 during the last half of time slot n+1. Including the cable delay for 100 ft. cable plus the 80 nanosecond clock skew the PCM voice sample and control signals would not be written into the buffer 67 until the first half of time slot n+2.

Buffer 67 is read by the RA control signal derived from the least significant bit of the time slot counter of MCRD 75 and the P2 signal. The value of the least significant bit of the time slot counter is latched during the positive edge of the P2 signal and sent to buffer 67 as the RA signal. The PCM voice samples read out of bufer 67 are captured by output latch 68 for transmission to the space stage matrix using the LEN control signal derived from the positive edge of the P0 clock.

As can be seen in FIG. 3, the PCM samples at the output of the time and control unit may reach the buffer either in time slot n+1 or during time slot n+2. PCM samples are always read out of the buffer during the latter half of time slot n+2, therefore, a one time slot slippage which is a function of the operation of the buffer is developed by the interface. The method used to accomplish the one time slot slippage will now be explained in detail.

Figure 4:
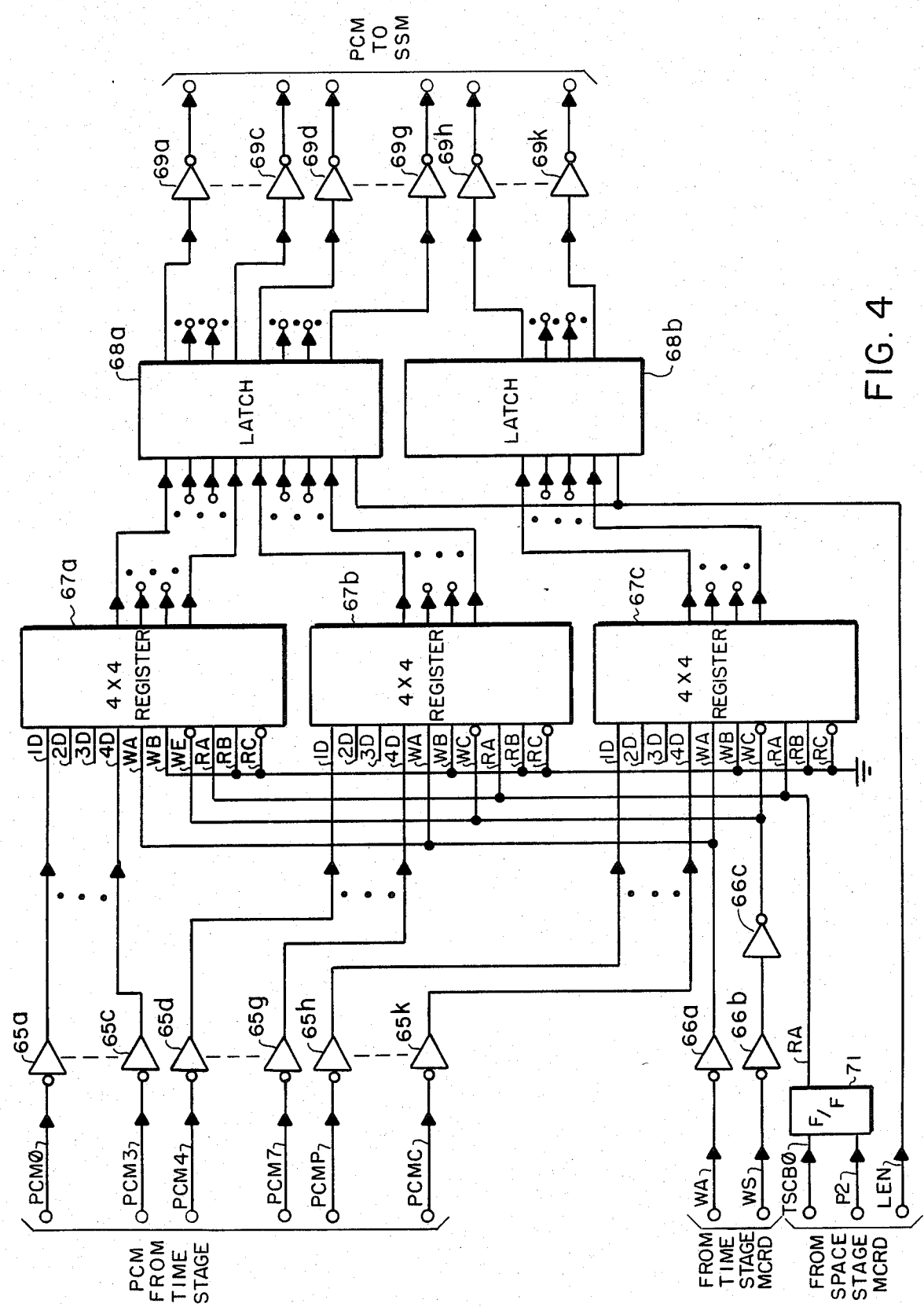
FIG. 4 is a detailed schematic illustrating the interface of the present invention.

Turning now to FIG. 4, a detailed schematic of the interface of the present invention is illustrated. It should be noted that the components of FIG. 4 are keyed to interface 60 found in the SS. The interface 4 in the TCU is substantially the same.

The interface is comprised of a number of inverting line receivers 65a through 65k connected to three 4×4 register files 67a through 67c which make up buffer 67. Each register file includes four input lines 1D-4D and the requisite read and write enable signals. Each register has ability to store four 4-bit words. The three register file outputs are connected to two octal D-type flip-flops 68a and 68b which are used as latches. As can be seen, only half of latch 68b is used in this embodiment. The output of the latches are connected to inverters 69a through 69k which are used as output buffers to the SSM.

PCM voice samples are input to the 4×4 registers 67a through 67c via line receivers 35a and 35k. Each register also receives the WA and WS signal from MCRD 55 via line receivers 66a through 66c. The RA signal to each register is derived from a flip-flop 71 which receives the least significant bit of the MCRD 75 time slot counter and is clocked by the P2 signal also from MCRD 75. The PCM voice samples read out of registers 67a-67c are captured by latches 38a and 38b by the latch enable signal LEN derived from the P0 clock signal from MCRD 75. The latched PCM sample is output to the space stage matrix through inverting buffers 67a through 67k.

With reference to the timing diagram of FIG. 3 and FIG. 4 an explanation of the operation of the interface will be given.

PCM samples read from the originating time stage during time slot n arrive at receivers 65a-65k and 66a and 65b during time slot n+1 (nominal condition) or in the first half of time slot n+2 (worst case condition). The received PCM samples are inverted and applied to inputs 1D through 4D of each register 67a-67c. The write address signal (WA) from the TCU MCRD 55 is inverted by 66a and applied to the WA input of each register. As explained earlier, the WA signal is the value of the least significant bit of MCRD 55 time slot counter. The value of the least significant bit received by receiver 66a is actually the value of the time slot counter during time slot n+1 or a logic high signal. The logic high signal is inverted by line receiver 66a and applied to the WA input of each register 36a through 36c. The WB address input is hard wired to ground, thereby addressing a first file (binary 00) within the registers. A negative going write strobe (WS) control signal is inverted twice via line receiver 66b and 66c and applied to the write enable (WE) input of each register, thereby capturing the PCM voice sample within the first file of each register.

During time slot n+1, the time slot counter of MCRD 75 also outputs a logic high which is applied to the input of flip-flop 71. At the next positive going edge of the P2 clock the value of the time slot counter is latched into the flip-flop outputting the RA control signal. The value of RA during time slot n+1 is a logic high. This value is applied to the RA input of each register. The RB input also is tied to ground thereby addressing the second register file (binary 10) used by the arrangement. Assuming that second register file contains a PCM sample (n−1), this sample now appears at the outputs of registers 67a through 67c. At the next positive transition of the P0 clock signal the latch enable (LEN) is applied to latches 38a through 38b capturing the PCM voice sample available at the outputs of registers 67a-67c. The sample is then transmitted to the space stage matrix via output buffers 69a through 69k.

In time slot n+2, MCRD 75 time slot counter has a negative value which is read into flip-flop 71 and clocked in during the next P2 clock transition. The RA signal from flip-flop 71 and the hard wired logic low available on RB, address the first register file (binary 00) placing the PCM voice sample from time slot n at the outputs of register 39a through 39c.

At the next positive transition of the P0 clock the LEN signal captures the PCM voice sample n into output latches 68a and 68b. The PCM voice sample is transmitted to the space stage matrix in the same manner outlined previously.

As can be seen in FIG. 3, the sample arriving at registers 67a-67c during time slot n+2 arrives before the next transition of P2 or the next read operation. It will be appreciated that the interface stores for one time slot the PCM samples in two different files with the samples sequentially being read out by accessing from one file to the other. In this manner one PCM sample may be stored in one file while at the same time the buffer is reading from the other file with the two operations being one time slot apart. Thereby, introducing a one time slot delay compensate for any delay introduced by clock skew and or long cables.

The present invention has been described to the reference of a specific embodiment thereof for the purpose of illustrating the manner in which the invention may be used to advantage. It will be appreciated by those skilled in the art that the invention is not limited thereto. Accordingly, any and all modifications, variations or equivalent arrangements which may occur to those skilled in the art should be considered to be within the scope of the invention.

What is claimed is:

1. An interface arrangement for buffering communication information between a transmitting stage and a receiving stage of a time-space-time digital switching network, said digital switching network including a network clock unit transmitting a master-clock signal and defining at least first and second time slots, said communication information transmitted from said transmitting stage during each time slot, said interface arrangement comprising:

storage means connected to said transmitting stage, said storage means including first and second addressable storage files:

first control signal generating means associated with said transmitting stage and arranged to receive said master-clock signal, said first control signal generating means developing and transmitting to said storage means during said first time slot a first set of control signals for addressing and writing said communication information into said first storage file, and during a second time slot a second set of control signals for addressing and writing said communication information into said second storage file;

second control signal generating means associated with said receiving stage and arranged to receive said master-clock signal, said second control signal generating means developing and transmitting to said storage means during said first time slot a first set of control signals for addressing and reading said communication information from said second storage file, and during said second time slot a second set of control signals for addressing and reading said communication information from said first storage file;

latching means connected to said storage means arranged to capture and transmit to said receiving stage said communications information read from said storage means, responsive to a latch enable control signal generated by said second control signal generating means; and said storage means operated in said first time slot to write said communication information in said first storage file and simultaneously to read said communication information from said second storage file and said storage means operated in said second time slot to write said communication information in said second storage file and simultaneously to read said communication information from said first storage file.

2. The interface as claimed in claim 1, wherein: said first control signal generating means is a master-clock receiver distributor which generates system timing for said transmitting stage, said master-clock receiver distributor including a time slot counter and a clock generator and said first set of control signals includes a write address signal normally the value of the least significant bit and said time slot counter during said first time slot and a write strobe derived from said clock generator.

3. The interface as claimed in claim 2, wherein: said second set of control signals includes a write address signal normally the value of the least significant bit of said time slot counter during said second time slot and a write strobe derived from said clock generator.

4. The interface as claimed in claim 3, wherein: said interface further includes a signal inverter receiving and inverting said write address signal from said master-clock receiver distributor.

5. The interface as claimed in claim 4, wherein: said storage means is comprised of a plurality of data registers and each data register includes inputs receiving said communication information from said transmitting stage and each register further includes first and second write address inputs and a write enable input, said second write address input receiving a permanently applied second write address signal and said first write address input and write enable input receiving said write address signal from said signal inverter and said write strobe signal from said master-clock receiver distributor, whereby during said first time slot said first and second write address signals are received by said first and second write address inputs addressing said first storage file and said write strobe signal writes said communication information available at each of said data register inputs in said first storage file.

6. The interface as claimed in claim 5, wherein: during said second time slot said first and second write address signals are received by said first and second write address inputs addressing said second storage file, and said write strobe signal writes said communication information available at each of said data register inputs in said first storage file.

7. The interface as claimed in claim 1, wherein: said second control signal generating means is a master-clock receiver distributor which generates system timing for said receiving stage, said master-clock receiver distributor including a time slot counter and a clock generator, and said first set of control signals includes a time slot counter bit 0 (TSCB0) signal normally the value of the least significant bit of said time slot counter during said first time slot and a phase 2 (PO2) clock signal derived from said clock generator.

8. The interface as claimed in claim 7, wherein: said second set of control signals includes a TSCB0 signal normally the value of the least significant bit of said time slot counter during second time slot and a PO2 clock signal derived from said clock generator.

9. The interface as claimed in claim 8, wherein: said interface further includes a flip-flop having a data input and a clock input and said TSCB0 signal is applied to said data input and said PO2 signal is supplied to said clock input, whereby a first read address signal is output from said flip-flop during said first time slot and a second read address signal is output from said flip-flop during said second time slot.

10. The interface as claimed in claim 9, wherein: said storage means is comprised of a plurality of data registers, each data register including outputs and each register further including first and second read address inputs and a read enable input, said second read address input receiving a permanently applied second read address signal and said read enable input receiving a permanently applied read enable signal, said first read address input receiving said first read address signal from said flip-flop, whereby during said first time slot said first and second read address signals received by said first and second read address inputs address said second storage file and said read enable signal outputs said communication information in said second storage file to said data register outputs.

11. The interface as claimed in claim 10, wherein: during said second time slot said first and second read address signals received by said first and second read address inputs address said first storage file and said read enable signal outputs said communication information in said first storage file to said data register outputs.

12. The interface as claimed in claim 11, wherein: said master-clock receiver distributor clock generator further generates said latch enable signal and said latch means includes a plurality of data latches each including inputs and outputs and a latch enable input, said latches inputs connected to said data register outputs and said latches outputs connected to said receiving stage, and responsive to said latch enable signal said latches capture said communication information available on said register outputs and transmits said communication information to said receiving stage.

* * * * *